(12) United States Patent
Shi

(10) Patent No.: US 11,240,873 B2
(45) Date of Patent: Feb. 1, 2022

(54) SRB TRANSMISSION METHOD AND DEVICE

(71) Applicant: GUANGDONG OPPO MOBILE TELECOMMUNICATIONS CORP., LTD., Dongguan (CN)

(72) Inventor: Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/912,520

(22) Filed: Jun. 25, 2020

(65) Prior Publication Data

US 2020/0329525 A1 Oct. 15, 2020

Related U.S. Application Data

(63) Continuation of application No. PCT/CN2017/118898, filed on Dec. 27, 2017.

(51) Int. Cl.
*H04W 76/11* (2018.01)
*H04W 80/02* (2009.01)
*H04W 76/27* (2018.01)
*H04W 80/08* (2009.01)

(52) U.S. Cl.
CPC ............ *H04W 80/02* (2013.01); *H04W 76/11* (2018.02); *H04W 76/27* (2018.02); *H04W 80/08* (2013.01)

(58) Field of Classification Search
CPC ..... H04W 80/02; H04W 76/11; H04W 76/27; H04W 80/08; H04W 80/00; H04W 28/04; H04L 1/08
See application file for complete search history.

(56) References Cited

U.S. PATENT DOCUMENTS

| 2001/0007137 A1* | 7/2001 | Suumaki | H04L 1/0082 |
| | | | 714/18 |
| 2008/0089285 A1 | 4/2008 | Pirskanen et al. | |
| 2016/0007389 A1* | 1/2016 | Shalev | H04W 76/10 |
| | | | 370/338 |
| 2019/0230732 A1* | 7/2019 | Yu | H04W 80/02 |
| 2020/0187297 A1* | 6/2020 | Jiang | H04W 76/12 |

FOREIGN PATENT DOCUMENTS

| CN | 102647803 A | 8/2012 |
| CN | 102655448 A | 9/2012 |
| CN | 106937238 A | 7/2017 |
| WO | WO2007091715 A1 | 8/2007 |
| WO | WO2014/128690 A2 | 8/2014 |

OTHER PUBLICATIONS

GPP750 et al. (RLC UM for NB-IoT for SRBs), R2-1710750. Oct. 2017.*

(Continued)

*Primary Examiner* — Lakeram Jangbahadur
(74) *Attorney, Agent, or Firm* — Morgan, Lewis & Bockius LLP

(57) ABSTRACT

A signaling radio bearer (SRB) transmission method includes: applying, according to configuration, radio link control (RLC) layer unacknowledged (UM) mode for all or part of SRB data.

5 Claims, 4 Drawing Sheets

(56) References Cited

OTHER PUBLICATIONS

Guangdong OPPO Mobile Telecommunications Corp. Ltd., Partial Supplementary European Search Report, EP17936539.0, dated Sep. 16, 2020, 13 pgs.
Ericsson, "RLC UM for NB-IoT for SRBs," 3GPP TSG-RAN WG2 #99bis, Oct. 13, 2017, 2 pgs.
Guangdong OPPO Mobile Telecommunications Corp. Ltd., International Search Report and Written Opinion, PCT/CN2017/118898, dated Jul. 27, 2018, 9 pgs.
Rani et al., "Further NB-IoT Enhancements," Status Report to TSG, 3GPP TSG RAN Meeting #77, RP-172089, Sep. 14, 2017, 14 pgs.
Guangdong OPPO Mobile Telecommunications Corp. Ltd., Extended European Search Report, EP17936539.0, dated Dec. 22, 2020, 12 pgs.
3GPP TS 36.331 V11.8.0 (Jun. 2014), 3rd Generation Partnership Project; Technical Specification Group Radio Access Network; Evolved Universal Terrestrial Radio Access (E-UTRA); Radio Resource Control (RRC), Protocol specification (Release 11), 354 pgs.
Guangdong OPPO Mobile Telecommunications Corp. Ltd., Notification of Reason for Refusal, KR10-2020-7020624, dated Sep. 27, 2021, 9 pgs.
Guangdong OPPO Mobile Telecommunications Corp. Ltd., Communication Pursuant to Article 94(3), EP17936539.0, dated Jul. 16, 2021, 7 pgs.

\* cited by examiner

SRB TRANSMISSION METHOD AND DEVICE

CROSS-REFERENCE TO RELATED APPLICATION

The present application is a continuation of PCT Application No. PCT/CN2017/118898, entitled "SRB TRANSMISSION METHOD AND DEVICE" filed Dec. 27, 2017, the entire content of which is incorporated herein by reference.

TECHNICAL FIELD

The present application relates to the field of wireless communication technology, and in particular, to an SRB transmission method and device.

BACKGROUND

Both LTE (Long Term Evolution) and 5G technologies consider the deployment of licensed and unlicensed bands. Among them, the unlicensed-bands technology of LTE is designed based on the assumption of Pcell (Primary cell) on the licensed frequency band. Specifically, SRB (Signaling Radio Bearer) is transmitted over the licensed cell. Therefore, the transmission of SRB can be guaranteed with time delay and transmission success rate.

As the unlicensed-bands technology of NR (New Radio), it is also considered to implement Pcell over unlicensed frequency bands. Typically, SRB is configured in AM (Acknowledgement) mode at the RLC (Radio Link Control) layer. Since SRB and DRB (Data Radio Bearer) data cannot be differentiated by the RLC layer, both of them will be transmitted at the same time. In AM mode, ARQ (Automatic Repeat-reQuest) needs feedback, and LBT (Listen Before Talk) is also required to be executed in the feedback. Therefore, too many LBT operations may easily lead to increased transmission delay during interaction of SRB signaling.

SUMMARY

In view of above, the application provides an SRB transmission method and device, so as to reduce transmission delay of SRB in the unlicensed frequency band technology of NR.

According to an aspect of embodiments of the application, there is provided an SRB transmission method, including:

applying, according to configuration, RLC layer UM mode for all or part of SRB data.

According to an embodiment of the application, the applying, according to configuration, RLC layer UM mode for all or part of SRB data includes:

indicating, at the RRC layer, the SRB data applying the RLC layer UM mode, and transferring indication information to the RLC layer via a PDCP layer.

According to an embodiment of the application, the indicating the SRB data applying the RLC layer UM mode includes:

filling, in the SRB data, identification information on applying the RLC layer UM mode; or indicating the SRB data applying the RLC layer UM mode by means of interlayer primitives.

According to an embodiment of the application, the applying, according to configuration, RLC layer UM mode for all or part of SRB data includes:

performing, at the RLC layer, UM encapsulation on the SRB data applying the RLC layer UM mode.

According to an embodiment of the application, the method further includes:

performing, by a transmitting end, repeated transmission on the SRB data applying the RLC layer UM mode; or performing, by a receiving end, deduplication process on the SRB data applying the RLC layer UM mode.

According to an embodiment of the application, the repeated transmission or deduplication process is performed at a PDCP layer; or the repeated transmission or deduplication process is performed at the RLC layer; or the repeated transmission or deduplication process is performed at a media access control (MAC) layer.

According to an embodiment of the application, a number of the repeated transmission, information on starting the repeated transmission or deduplication process, or information on stopping the repeated transmission or deduplication process is configured by a base station.

According to an embodiment of the application, the number of the repeated transmission, the information on starting the repeated transmission or deduplication process, or the information on stopping the repeated transmission or deduplication process is configured by the base station through RRC signaling or MAC signaling.

According to another aspect of embodiments of the application, there is provided an SRB transmission device, including:

a processing unit, configured to apply, according to configuration, RLC layer UM mode for all or part of SRB data.

According to an embodiment of the application, the processing unit includes:

an indicating module, configured to indicate, at the RRC layer, the SRB data applying the RLC layer UM mode, and transfer indication information to the RLC layer via a PDCP layer.

According to an embodiment of the application, the indicating module is specifically configured to:

fill, in the SRB data, identification information on applying the RLC layer UM mode; or indicate the SRB data applying the RLC layer UM mode by means of interlayer primitives.

According to an embodiment of the application, the processing unit includes:

an RLC layer module, configured to perform, at the RLC layer, UM encapsulation on the SRB data applying the RLC layer UM mode.

According to an embodiment of the application, the device further includes a retransmitting unit or a deduplicating unit, the retransmitting unit is configured to perform, at a transmitting end, repeated transmission on the SRB data applying the RLC layer UM mode;

the deduplicating unit is configured to perform, at a receiving end, deduplication process on the SRB data applying the RLC layer UM mode.

According to an embodiment of the application, the retransmitting unit or deduplicating unit is implemented at a PDCP layer; or the retransmitting unit or deduplicating unit is implemented at the RLC layer; or the retransmitting unit or deduplicating unit is implemented at a MAC layer.

According to an embodiment of the application, a number of the repeated transmission, information on starting the repeated transmission or deduplication process, or information on stopping the repeated transmission or deduplication process is configured by a base station.

According to an embodiment of the application, the number of the repeated transmission, the information on starting the repeated transmission or deduplication process, or the information on stopping the repeated transmission or deduplication process is configured by the base station through RRC signaling or MAC signaling.

The present application further provides an apparatus, including:
one or more processors;
a memory; and
one or more programs, wherein the one or more programs are stored in the memory and executed by the one or more processors to perform operations in the method as described above.

The present application further provides a storage medium containing computer-executable instructions which, when being executed by a computer processor, are used for performing operations in the method as described above.

It can be seen from the above technical solutions that in the method and device provided by the present application, the RLC layer UM mode is used for all or part of the SRB data, which avoids the need to perform LBT operation when feeding ARQ back in the AM mode, thereby reducing the transmission delay of SRB.

When this method is applied to the unlicensed frequency band, the efficiency of NR system operating in the unlicensed frequency band can be improved, and the delay of the control plane can be shortened.

Furthermore, in the present application, the SRB data applying the RLC layer UM mode may be repeatedly transmitted, thereby improving the reliability of signaling transmission and solving the problem of possible signaling loss.

DETAILED DESCRIPTION

Figure 1:
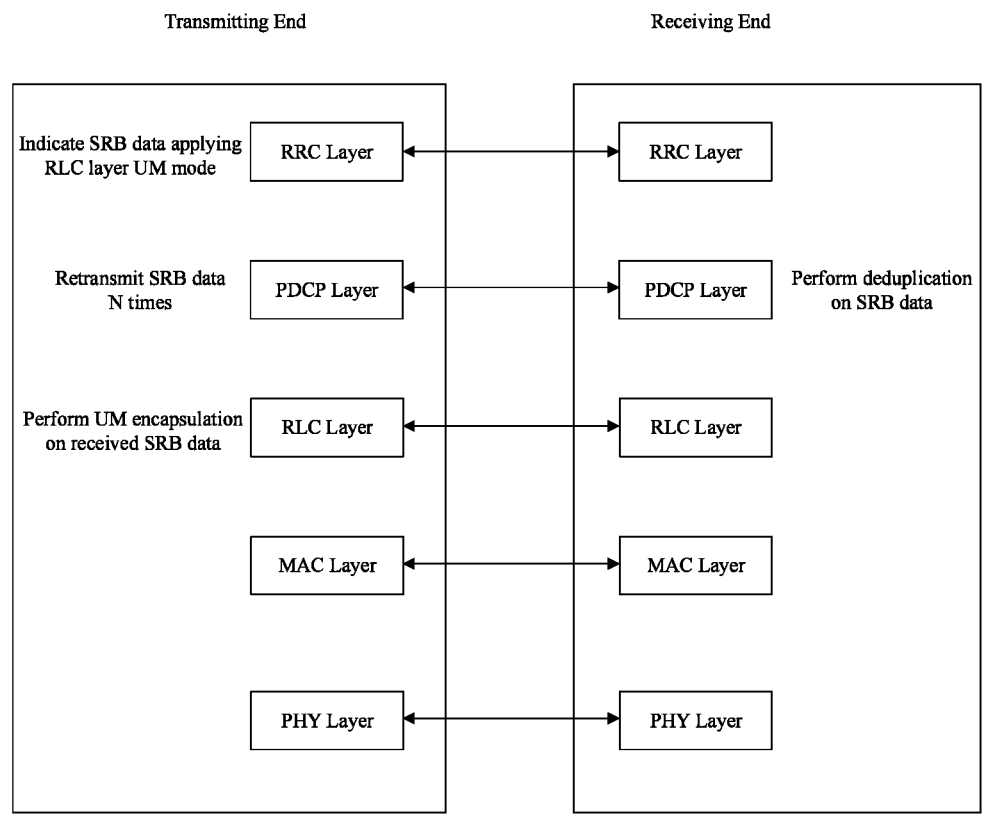
FIG. 1 is a schematic diagram illustrating an SRB transmission method according to a first embodiment of the present application.

In order to make the objectives, technical solutions and advantages of the present application clearer, the present application will be described in detail below with reference to the drawings and specific embodiments.

One of key concepts of the present application lies in that, according to the configuration, the RLC layer UM mode is used for all or part of the SRB data, so as to avoid the need to perform LBT operation when feeding ARQ back in the AM mode, thereby reducing the transmission delay of SRB.

The SRB data involved in the embodiments of the present application may include but is not limited to SRB0, SRB1, and SRB2. SRB0 is mainly used for transmitting RRC messages, which are transmitted on a logical channel CCCH. SRB1 is mainly used for transmitting RRC messages, which are transmitted on a logical channel DCCH. SRB2 is mainly used for transmitting NAS messages, which are transmitted on the logical channel DCCH.

In addition, in an embodiment of the present application, the RLC layer UM mode can be adopted for all or part of the SRB data, regardless of whether the SRB data is uplink SRB data or downlink SRB data.

In an embodiment of the present application, the RLC layer UM mode may be pre-configured for all or part of SRB data on all carriers, or the RLC layer UM mode may be pre-configured for all or part of SRB data on specific carriers. The specific carriers may include but not limited to unlicensed carrier.

In addition, it should be noted that, according to an embodiment of the present application, RLC layer UM mode and AM mode may be simultaneously applied for different SRB data in the same system. For example, different carriers may be used for carrying SRB data in different modes, or even the same carrier may be used for carrying SRB data in different modes, but the SRB data in the RLC layer UM mode is indicated.

When the RLC layer UM mode is applied for all or part of the SRB data according to the configuration, it can be indicated which SRB data needs to apply the RLC layer UM mode, so that the RLC layer can apply the UM mode for these SRB data. Specifically, the following two manners can be used, but the application is not limited thereto.

In the first manner, the RLC layer UM mode is identified in the SRB data. As to this manner, identification information may need to be carried in the transmitted SRB data. For example, identification information can be carried in the header of the SRB data to identify that the SRB data adopts the RLC layer UM mode.

In the second manner, the SRB data applying the RLC layer UM mode is indicated through the interlayer primitives. There is no need to modify the SRB data itself in this manner. When the SRB data is transferred between respective protocol layers, only the interlayer primitives of the current transfer are used for indicating that the SRB data applies the RLC layer UM mode.

If the RLC layer UM mode is applied for all or part of the SRB data, in order to improve the reliability of signaling transmission and solve the problem of possible signaling loss, the transmitting end may adopt a mechanism of repeated transmission for SRB data applying the RLC layer UM mode. In other words, the same SRB data may be sent N times, where N is a pre-configured positive integer. Correspondingly, the SRB data applying the RLC layer UM mode can be deduplicated at the receiving end.

In an embodiment, the above-mentioned repeated transmission may be performed by the transmitting end at the PDCP (Packet Data Convergence Protocol) layer, and accordingly, the deduplication process can be performed by the receiving end at the PDCP layer. Optionally, the above-mentioned repeated transmission may be performed at the RLC layer of the transmitting end, and accordingly, the deduplication process may be performed at the RLC layer of the receiving end. Optionally, the above-mentioned repeated transmission may be performed at the MAC (Media Access Control) layer of the transmitting end, and accordingly, the deduplication process may be performed at the MAC layer of the receiving end. The specific protocol layer at which the above processed are to be performed may be pre-configured.

Some embodiments are given as follows.

First Embodiment

As shown in FIG. 1, when the transmitting end indicates the generated SRB data at the RRC layer, one of the above two manners can be used, that is, the manner of carrying identification information in the SRB data, or the manner of using interlayer primitives to indicate the SRB data applying the RLC layer UM mode. If the former manner is used, identification information may be carried in the packet header of the SRB data to indicate that the SRB data applies the RLC layer UM mode. The PDCP layer may determine that the SRB data needs to apply the RLC layer UM mode according to the identification information carried in the header of the SRB data. In this embodiment, it is pre-configured to perform the mechanism of repeated transmission at the PDCH layer, so that the SRB data is repeatedly transmitted N times at the PDCP layer. Assuming N is 2, a PDU (Protocol Data Unit) formed by the SRB data is transmitted twice to RLC layer. The RLC layer performs UM encapsulation on the received PDU. Correspondingly, deduplication process is performed on the SRB data at the PDCP layer of the receiving end. In other words, after the RLC layer transmits RLC data (including SRB data) to the PDCP layer, the PDCP layer performs data deduplication process.

Second Embodiment

Figure 2:
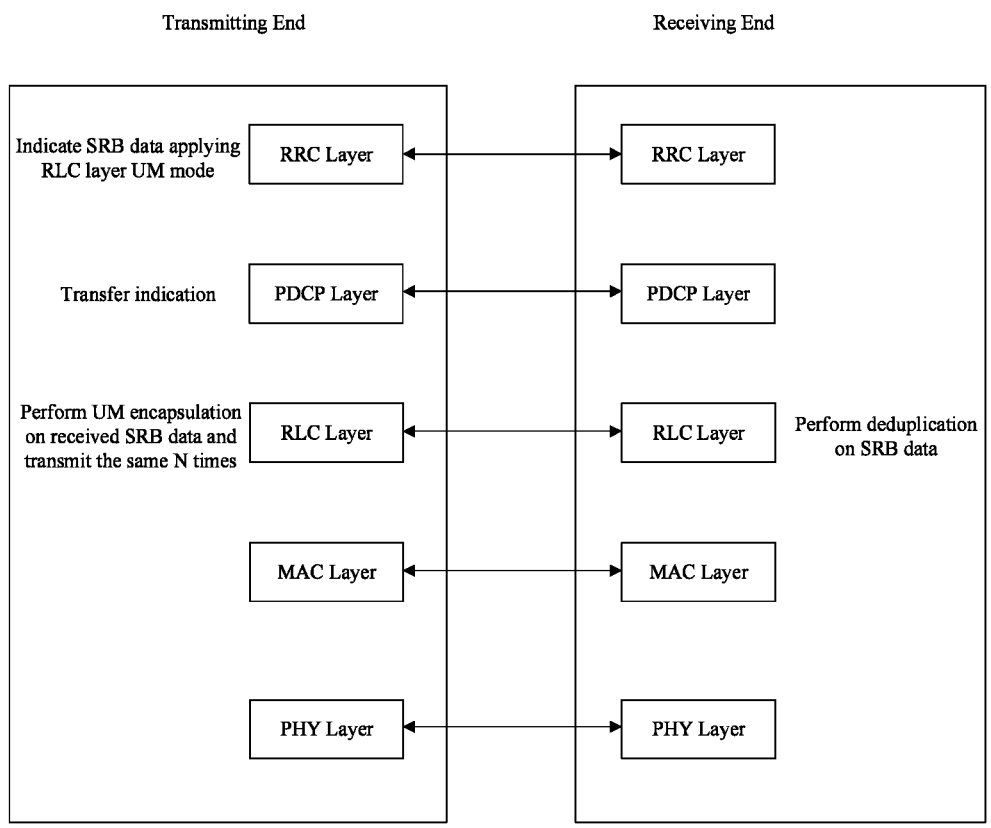
FIG. 2 is a schematic diagram illustrating an SRB transmission method according to a second embodiment of the present application.

As shown in FIG. 2, when the transmitting end indicates the generated SRB data at the RRC layer, one of the above two manners can be used, that is, the manner of carrying identification information in the SRB data, or the manner of using interlayer primitives to indicate the SRB data applying the RLC layer UM mode. Such indication may be transferred to the RLC layer through the PDCP layer, for example, it is indicated by identification information carried in the packet header of data encapsulation at each layer. In this embodiment, it is pre-configured to perform the mechanism of repeated transmission at the RLC layer, so that the PDU (i.e., the PDU formed by the SRB data) received by RLC layer is repeatedly transmitted N times after UM encapsulation. Assuming N is 2, the PDU formed by the SRB data is transmitted twice after UM encapsulation. Correspondingly, deduplication process is performed on the SRB data at the RLC layer of the receiving end.

Third Embodiment

Figure 3:
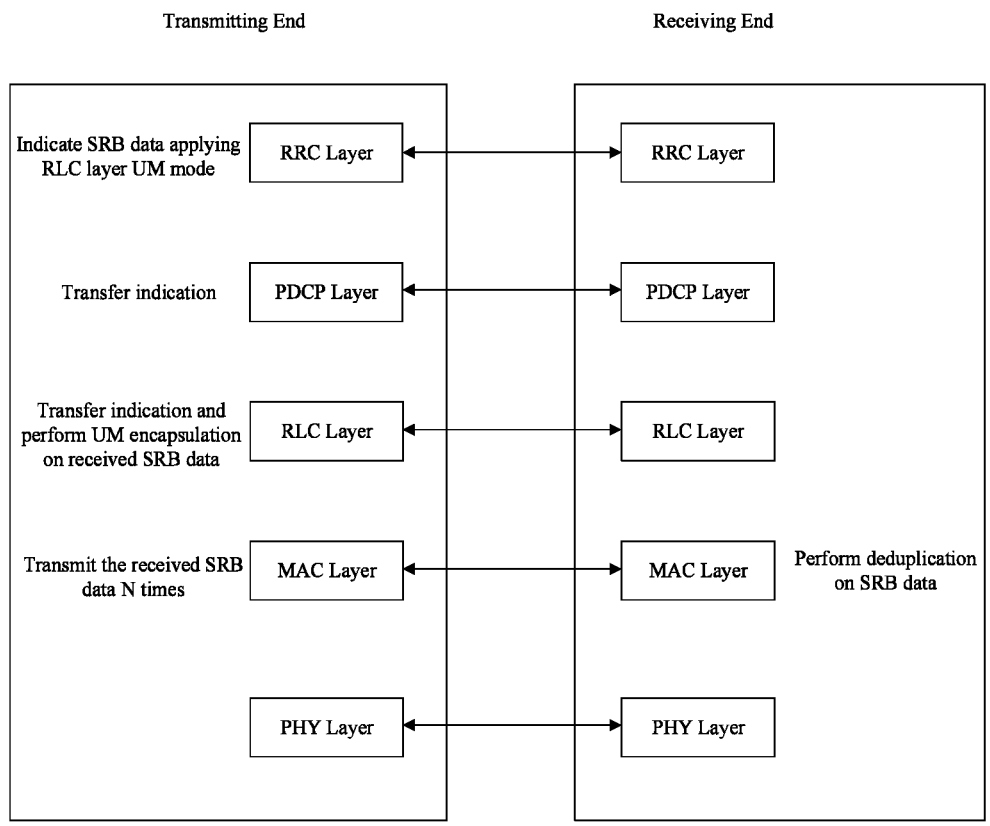
FIG. 3 is a schematic diagram illustrating an SRB transmission method according to a third embodiment of the present application.

As shown in FIG. 3, when the transmitting end indicates the generated SRB data at the RRC layer, one of the above two manners can be used, that is, the manner of carrying identification information in the SRB data, or the manner of using interlayer primitives to indicate the SRB data applying the RLC layer UM mode. Such indication may be transferred to the MAC layer through the PDCP layer and the RLC layer, for example, it is indicated by identification information carried in the packet header of data encapsulation at each layer. In addition, UM encapsulation is performed on the PDU formed by the SRB data at the RLC layer. In this embodiment, it is pre-configured to perform the mechanism of repeated transmission at the MAC layer. In other words, if the repeated transmission is not supported at the PDCP layer and the RLC layer, it may be performed at the MAC layer, so that the received SRB data is repeatedly transmitted N times by MAC layer according to the indication. Assuming N is 2, the SRB data is transmitted twice at the MAC layer. Correspondingly, deduplication process is performed on the SRB data at the MAC layer of the receiving end when receiving repeated SRB data.

It should be noted that, in each of the foregoing embodiments, the LBT mechanism may be used for each time of retransmission.

In the foregoing embodiments, the base station may configure the number N of repeated transmissions, or the base station may configure the start of repeated transmission or deduplication process, or the base station may configure the stop of repeated transmission or deduplication process. Specifically, the base station may implement the above configuration through, but not limited to, RRC signaling or MAC signaling.

The above is the description of the method provided by the present application, and the device provided by the present application will be described in detail below in conjunction with the embodiments.

Figure 4:
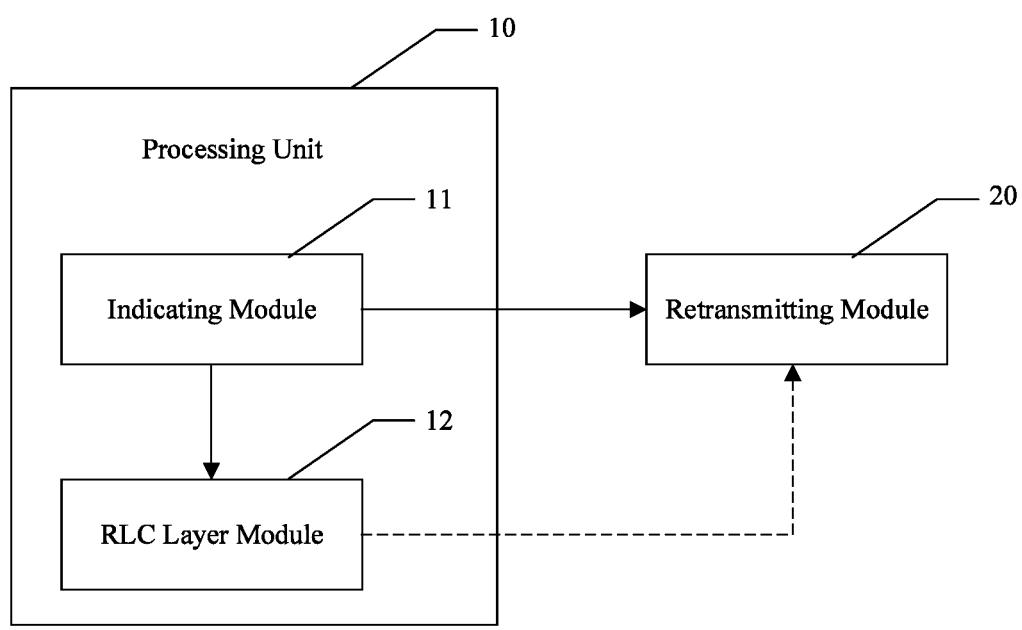
FIG. 4 is a block diagram illustrating an SRB transmission device according to an embodiment of the present application.

FIG. 4 is a block diagram illustrating an SRB transmission device according to an embodiment of the present application. As shown in FIG. 4, the device may include: a processing unit 10, and may further include a retransmission unit 20 or a deduplication unit 30. The main functions of each component unit are as follows.

The processing unit 10 is configured to apply, according to configuration, radio link control (RLC) layer unacknowledged (UM) mode for all or part of SRB data. The SRB data as involved may include, but is not limited to, SRB0, SRB1, and SRB2. In addition, the RLC layer UM mode can be adopted for all or part of the SRB data, regardless of whether the SRB data is uplink SRB data or downlink SRB data.

The RLC layer UM mode may be pre-configured for all or part of SRB data on all carriers, or the RLC layer UM mode may be pre-configured for all or part of SRB data on specific carriers. The specific carriers may include but not limited to unlicensed carrier.

Specifically, the processing unit 10 may include an indication module 11, configured to indicate the SRB data applying the RLC layer UM mode in, but not limited to, the following two manners.

In the first manner, the RLC layer UM mode is identified in the SRB data. As to this manner, identification information may need to be carried in the transmitted SRB data. For example, identification information can be carried in the header of the SRB data to identify that the SRB data adopts the RLC layer UM mode.

In the second manner, the SRB data applying the RLC layer UM mode is indicated through the interlayer primitives. There is no need to modify the SRB data itself in this manner. When the SRB data is transferred between respective protocol layers, only the interlayer primitives of the current transfer are used for indicating that the SRB data applies the RLC layer UM mode.

The above indication module 11 may be implemented at the RRC layer or the PDCP layer. Specifically, the generated SRB data may be indicated at the RRC layer. The indication may be performed in one of the above two manners, and then transmitted to the RLC layer through the PDCP layer. If the above first manner is adopted, when the SRB data is protocol encapsulated at the RRC layer, identification information, indicating that the SRB data applies the RLC layer UM mode, may be encapsulated in the data header. According to the identification information, when the protocol encapsulation is performed at the PDCP layer for passing to the next layer, identification information, indicating that the SRB data applies the RLC layer UM mode, may be also encapsulated in the data header. If the above second manner is adopted, when the RRC layer transfers data to the PDCP layer, interlayer primitives of the current transferring may be used for indicating that the SRB data applies the RLC layer UM mode. Similarly, when the PDCP layer transfers data to the RLC layer, interlayer primitives of the current transferring may be used for indicating that the SRB data applies the RLC layer UM mode.

In addition, the processing unit 10 further includes an RLC layer module 12, configured to perform UM encapsulation on the SRB data applying the RLC layer UM mode at the RLC layer.

In addition, if the RLC layer UM mode is applied for all or part of the SRB data, in order to improve the reliability of signaling transmission and solve the problem of possible signaling loss, if the device is located at the transmitting end, it may further include a retransmission unit 20; if the device is located at the receiving end, it may further include a deduplication unit (not shown in the drawing).

The retransmission unit 20 is configured to perform, at the transmitting end, repeated transmission on the SRB data applying the RLC layer UM mode. In other words, the same SRB data can be transmitted N times, where N is a pre-configured positive integer.

The deduplication unit is configured to perform, at the receiving end, deduplication process on the SRB data applying the RLC layer UM mode.

The retransmission unit 20 and the deduplication unit may be implemented at the PDCP layer; optionally, the retransmission unit 20 and the deduplication unit may be implemented at the RLC layer; optionally, the retransmission unit 20 and the deduplication unit may be implemented at the MAC layer.

The number of repeated transmissions, the start of repeated transmission or deduplication process, or the stop of repeated transmission or deduplication process can be configured by the base station. In other word, the retransmission unit 20 and the deduplication unit may start repeated transmission or deduplication, stop repeated transmission or deduplication processing, and determine the number of repeated transmissions according to the configuration of the base station.

More specifically, the number of repeated transmissions, the start of repeated transmission or deduplication process, or the stop of repeated transmission or deduplication process may be configured by the base station through RRC signaling or MAC signaling.

The above methods and devices provided by the embodiments of the present application may be implemented in one or more integrated circuits such as codec chips, or may be implemented by a program instructing related hardware, and the program may be stored in a computer-readable storage medium. The units in the above embodiments may be implemented in the form of hardware or software function modules. The application does not limit the combination of any specific form of hardware and software.

For example, it can be implemented by an apparatus, which includes:
one or more processors;
a memory; and
one or more programs, wherein the one or more programs are stored in the memory and executed by the one or more processors to perform the following operations:
applying, according to configuration, RLC layer UM mode for all or part of SRB data.

In addition, with the development of time and technology, the meaning of medium is becoming more and more extensive, and the propagation path of programs is no longer limited to tangible medium, but can also be downloaded directly from the network. Any combination of one or more computer-readable medium may be used. The computer-readable medium may be a computer-readable signal medium or a computer-readable storage medium. The computer-readable storage medium may be, for example, but not limited to, an electrical, magnetic, optical, electromagnetic, infrared, or semiconductor system, apparatus, device, or any combination of the above. More specific examples (non-exhaustive list) of the computer readable storage medium include: electrical connections with one or more wires, portable computer disks, hard disks, random access memory (RAM), read only memory (ROM), erasable programmable read-only memory (EPROM or flash memory), optical fiber, portable compact disk read-only memory (CD-ROM), optical storage device, magnetic storage device, or any suitable combination of the foregoing. In this disclosure, the computer-readable storage medium may be any tangible medium that contains or stores a program, and the program may be used by or in combination with an instruction execution system, apparatus, or device.

The computer-readable signal medium may include a data signal that is propagated in baseband or as part of a carrier wave, in which computer-readable program code is carried. This propagated data signal can take many forms, including but not limited to electromagnetic signals, optical signals, or any suitable combination of the above. The computer-readable signal medium may also be any computer-readable medium other than a computer-readable storage medium, and the computer-readable medium may send, propagate, or transmit a program for use by or in combination with an instruction execution system, apparatus, or device.

The above are only preferred embodiments of the present application and are not intended to limit the present application. Any modification, equivalent replacement, improvement and the like made within the spirit and principle of the present application should be included within protection scope of the present application.

What is claimed is:

1. A signaling radio bearer (SRB) transmission method, comprising:
applying, according to configuration, radio link control (RLC) layer unacknowledged (UM) mode for all or part of SRB data, wherein the SRB data includes SRB0, SRB1, and SRB2, SRB0 is used for transmitting RRC messages transmitted on a logical channel CCCH, SRB1 is used for transmitting RRC messages transmitted on a logical channel DCCH, and SRB2 is used for transmitting NAS messages transmitted on the logical channel DCCH,
wherein the applying, according to configuration, RLC layer UM mode for all or part of SRB data comprises:
indicating, at a radio resource control (RRC) layer, the SRB data applying the RLC layer UM mode by filling, in a packet header of the SRB data, identification information on applying the RLC layer UM mode, and transferring the identification information to a RLC layer via a packet data convergence protocol (PDCP) layer,
the method further comprises:
determining, by the PDCP layer, that the SRB data needs to apply the RLC layer UM mode according to the identification information carried in the packet header of the SRB data, and performing, at the PDCP layer, UM encapsulation and repeated transmission on the SRB data applying the RLC layer UM mode, wherein a number of the repeated transmission, information on starting the repeated transmission or deduplication process, or information on stopping the repeated transmission or deduplication process is configured by a base station.

2. The method according to claim 1, wherein the number of the repeated transmission, the information on starting the repeated transmission or deduplication process, or the information on stopping the repeated transmission or deduplication process is configured by the base station through RRC signaling or MAC signaling.

3. A signaling radio bearer (SRB) transmission device, comprising:
one or more processors;
a memory; and
one or more programs stored in the memory, wherein the one or more processors, when executing the one or more programs, are configured to:
apply, according to configuration, radio link control (RLC) layer unacknowledged (UM) mode for all or part of SRB data, wherein the SRB data includes SRB0, SRB1, and SRB2, SRB0 is used for transmitting RRC messages transmitted on a logical channel CCCH, SRB1 is used for transmitting RRC messages transmitted on a logical channel DCCH, and SRB2 is used for transmitting NAS messages transmitted on the logical channel DCCH,
wherein the one or more processors are further configured to:
indicate, at a radio resource control (RRC) layer, the SRB data applying the RLC layer UM mode by filling, in a packet header of the SRB data, identification information on applying the RLC layer UM mode, and transfer the identification information to a RLC layer via a packet data convergence protocol (PDCP) layer,
determine, at the PDCP layer, that the SRB data needs to apply the RLC layer UM mode according to the identification information carried in the packet header of the SRB data, and
perform, at the PDCP layer, UM encapsulation and repeated transmission on the SRB data applying the RLC layer UM mode, wherein a number of the repeated transmission, information on starting the repeated transmission or deduplication process, or information on stopping the repeated transmission or deduplication process is configured by a base station.

4. The device according to claim 3, wherein the number of the repeated transmission, the information on starting the repeated transmission or deduplication process, or the information on stopping the repeated transmission or deduplication process is configured by the base station through RRC signaling or MAC signaling.

5. A non-transitory computer readable storage medium storing a plurality of computer-executable instructions that, when executed by one or more processors, cause the one or more processors to:
apply, according to configuration, radio link control (RLC) layer unacknowledged (UM) mode for all or part of SRB data, wherein the SRB data includes SRB0, SRB1, and SRB2, SRB0 is used for transmitting RRC messages transmitted on a logical channel CCCH, SRB1 is used for transmitting RRC messages transmitted on a logical channel DCCH, and SRB2 is used for transmitting NAS messages transmitted on the logical channel DCCH,
wherein computer-executable instructions further cause the one or more processors to:
indicate, at a radio resource control (RRC) layer, the SRB data applying the RLC layer UM mode by filling, in a packet header of the SRB data, identification information on applying the RLC layer UM mode, and transfer the identification information to a RLC layer via a packet data convergence protocol (PDCP) layer,
determine, at the PDCP layer, that the SRB data needs to apply the RLC layer UM mode according to the identification information carried in the packet header of the SRB data, and
perform, at the PDCP layer, UM encapsulation and repeated transmission on the SRB data applying the RLC layer UM mode,
wherein a number of the repeated transmission, information on starting the repeated transmission or deduplication process, or information on stopping the repeated transmission or deduplication process is configured by a base station.

* * * * *